United States Patent [19]

Rauffer et al.

[11] Patent Number: 4,754,875

[45] Date of Patent: Jul. 5, 1988

[54] ROLL FILM MAGAZINE FRAME FOR SUPPORTING FILM RECEIVING FILM SPOOL AND USING IN A READING DEVICE

[75] Inventors: Walter Rauffer, Steinebach; Eugen Schuhmeir, Neubiberg; Günter Czapla, Sauerlach, all of Fed. Rep. of Germany

[73] Assignee: AGFA-GEVAERT AG, Leverkusen, Fed. Rep. of Germany

[21] Appl. No.: 897,846

[22] Filed: Aug. 18, 1986

[30] Foreign Application Priority Data

Aug. 31, 1985 [DE] Fed. Rep. of Germany ... 8524987[U]

[51] Int. Cl.$^4$ .............................................. B65D 85/38
[52] U.S. Cl. ..................................... 206/316; 206/389; 242/197; 242/55.53; 352/78 R
[58] Field of Search ............... 206/316, 387, 408, 415, 206/416, 444, 389; 242/197; 352/72, 78 R; 360/95, 132

[56] References Cited

U.S. PATENT DOCUMENTS

| | | | |
|---|---|---|---|
| 3,655,145 | 4/1972 | Olsen | 242/197 |
| 3,700,188 | 10/1972 | Bradford et al. | 242/197 |
| 3,718,301 | 2/1973 | Morton | 242/197 |
| 3,752,413 | 8/1973 | Carso | 206/316 |
| 4,002,238 | 1/1977 | Cameron et al. | 206/408 |
| 4,527,691 | 7/1985 | Pertzsch et al. | 206/387 |
| 4,564,120 | 1/1980 | Pertzsch et al. | 206/387 |

Primary Examiner—David T. Fidei
Attorney, Agent, or Firm—Michael J. Striker

[57] ABSTRACT

A roll film magazine frame for supporting a film spool which receives a roll film and for inserting through an insertion opening into a shaft of a micro roll film reading device, the roll film magazine frame comprises a polygonal body part having a plurality of sides and a plurality of corners each between two adjacent sides, the body part having a recess provided in one of the sides for introducing a film from a film coil into the reading device, an opening provided in another side for introducing a friction member of the reading device for contacting a roll film on the film spool, the side of the body part including a further side which is accessible from outside when the magazine frame is inserted in the shaft, the further side being formed as a cover which is turnable outwardly away of a remaining portion of the body part so as to allow withdrawal of the film spool from the body part and insertion of another film spool into the body part.

13 Claims, 1 Drawing Sheet

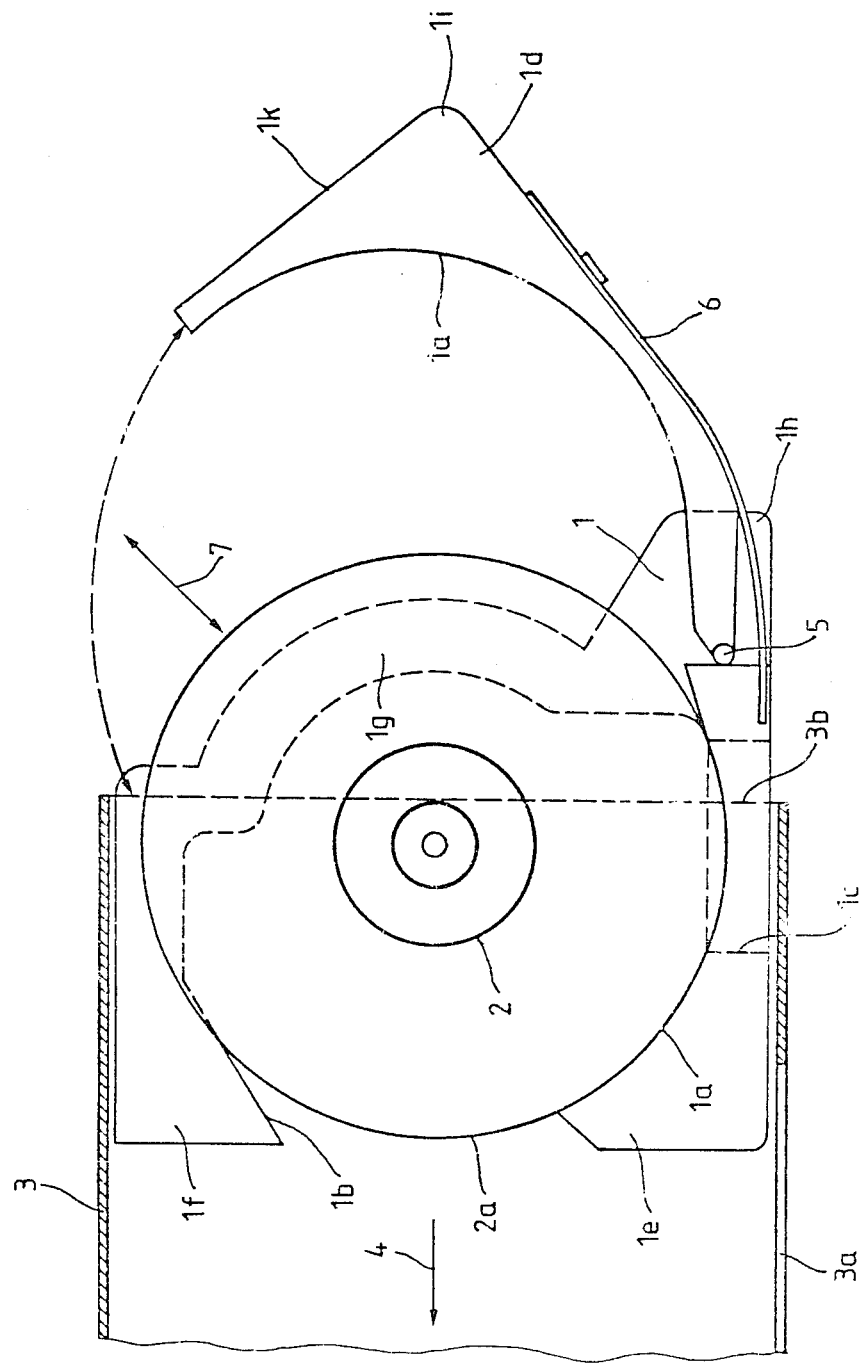

4,754,875

ROLL FILM MAGAZINE FRAME FOR SUPPORTING FILM RECEIVING FILM SPOOL AND USING IN A READING DEVICE

BACKGROUND OF THE INVENTION

The present invention relates to a roll film magazine frame for supporting a film spool which receives a film roll and for using in a roll film reading device.

Roll film magazines of this type are known in the art. A known roll film magazine includes a polygonal, for example somewhat rectangular, body part formed so that a film spool for receiving a roll film and provided with flanges is insertable into the magazine frame. The magazine frame has a recess formed at its one small side for inserting a film from the film spool into the reading device, and also an opening provided in another small side for introducing a friction roller of the reading device for transporting the film. It is also known that the magazine frame together with the recess and the opening is insertable into a channel through its insertion opening. Roll film magazine frames of this type as well as micro roll film reading devices in which the frames are used are disclosed for example in the German document DE-GMS No. 8,414,228. The known arrangements operate so that each roll film spool is inserted into a roll film magazine frame, and then the magazine frames are stored in cassettes. A user is not supplied with the magazine frame for each film spool. For each film spool exchange the user must remove an available magazine frame from the channel of the reading device, to withdraw the inserted spool from the magazine frame and to insert into it another required spool. It is believed to be understood that such manipulations are complicated and take long time.

SUMMARY OF THE INVENTION

Accordingly, it is an object of the present invention to provide a magazine frame of the above mentioned type, which avoids the disadvantages of the prior art.

More particularly, it is an object of the present invention to provide a magazine frame which is compatible with known magazine frames and at the same time allows exchange of film spools by means of only partial withdrawal from the channel of the reading device.

In keeping with these objects and with others which will become apparent hereinafter, one feature of the present invention resides, briefly stated, in that the magazine frame has such a body part whose available side after insertion into a channel is formed as a cover which is outwardly turnable from a remaining portion of the body part for film spool exchange.

When the magazine frame is designed in accordance with the present invention, it eliminates the above described disadvantages and provides for a possibility of exchanging the film spools during only partial withdrawal of the magazine frame from the shaft of a reading device. This makes the film spool exchange very simple and fast.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a plan view of a roll film magazine frame in accordance with the present invention, partially inserted in a channel of a not shown reading device in an exchange position for a roll film.

DESCRIPTION OF A PREFERRED EMBODIMENT

A substantially rectangular magazine frame in accordance with the present invention is identified as a whole with reference numeral 1. It has a circular central cutout 1a. A flange 2a of a micro roll film spool is insertable into the cutout 1a from a flat side of the frame in a direction normal to the plane of the drawing. The flange 2a can engage the central cutout 1a loosely rotatably by means of not shown bead. A not shown micro roll film is located on the spool 2.

In one of its small sides, the magazine frame 1 has a recess 1b. An initial portion of the film and then the roll film itself is coiled through the recess 1b and through a micro roll film reading device for reading purpose, and then back is coiled onto the spool 2. Moreover, at another small side of the magazine frame 1, which is perpendicular to the above mentioned small side, a further opening 1c is provided. When the magazine frame 1 is inserted into a micro roll film reading device, a not shown friction roll provided in the device and known per se projects through the opening 1c until it turns to the outermost convolution of the film roll. By means of the friction roll, the initial portion of the film is coiled from the magazine frame 1 or its recess 1b outwardly and coiled into the device until it hangs on the winding-on spool in the device and then pulled further by the drive of of the winding-on spool. For back coiling, the micro film spool 2 is driven on its spool core in an opposite direction.

The magazine frame 1 is inserted into a respectively provided magazine shaft 3 of a micro film reading device (which is not shown in detail), so that its recess 1b faces toward an insertion direction 4. A side wall of the shaft has a cutout 3a for passage of a not shown driving roll into the opening 1c of the magazine frame 1. The shaft 3 is open at its outer side 3b. The magazine frame 1 can be inserted through the open outer side 3b into the shaft 3 or withdrawn from the shaft 3 through the same open sie.

In order to utilize the magazine frame 1 as an exchange frame and to exchange to spool 2 in it without removing the whole magazine frame 1 from the shaft 3 of a reading device, the magazine frame 1 is provided with a turnable cover 1d. The cover 1d is formed by a small side of the frame which is located in the opening 3b of the shaft 3. The cover 1d is turnable back and forth in the directions identified by the double arrow between an open position which is shown in the drawing and a closed position which is not shown.

In the shown example, the lower side of the magazine frame is formed as a bracket-like receiving plate 1g for the film spool 2, 2a. The receiving plate 1g simultaneously connects both magazine parts 1e and 1f which surround the opening 1b at its both sides. The magazine parts 1e and 1f which form the cutout 1a and 1b are mounted on the plate 1g or formed of one-piece therewith. They have a height which at least corresponds to the height of the spool 2 so that the spool 2 is sunk in these parts or is flush with their upper surface. The plate 1g and the parts 1e and 1f form flatly three quarters of the rectangular contour of the magazine frame 1.

The cover 1d is pivotally mounted above the third outer corner 1h of the magazine frame 1. More particularly, it is mounted on a free end of the projecting part 1e in a known manner, for example by means of a hinge 5. The cover 1d extends over a partial region of the border of the cutout 1a, the small side of the frame which lies during use in the insertion opening 3b, a fourth frame corner 1i or its respective fourth short frame edge, and a partial region 1k to the part 1f at the frame small side which is opposite to the opening 1c. A flat spring 6 is arranged between the cover 1d and the frame part 1e or its small side.

When the magazine frame 1 is withdrawn so far from the shaft 3 as shown in the drawing so that the joint between the partial region 1k of the cover 1d and the part 1f of the magazine frame is located outside of the shaft 3, the cover 1d springs under the action of the spring 6 to a partially open position. From this position it can be further opened, so that the spool 2 can be removed in direction of the arrow 7 and another spool 2 can be inserted. Then the cover 1d is pressed by hand and the magazine frame 1 is again inserted into the shaft 3. The free end of the partial region 1k is retained in a form-locking manner in the channel 3 so that the magazine frame 1, 1d is closed.

It is to be understood that some modifications of the cover 1d are possible. For example, instead of the cover shown in the drawing, another cover can be used which extends only over a magazine small side which is opposite to the cutout 1b. Locking between the cover 1d and the part 1f can be performed in this case for example by a plastic snapping or arresting closure. The hinge 5 can also be dispensed with in the event when the spring 6 is mounted so that it simultaneously forms a hinge. In certain cases, the spring 6 can also be dispensed with and the cover 1d can be formed of one piece with the part 1e so that a plastic hinge is provided by a thinned portion of the material.

It will be understood that each of the elements described above, or two or more together, may also find a useful application in other types of constructions differing from the types described above.

While the invention has been illustrated and described as embodied in a roll film magazine frame for a film spool which receives a film roll, to be used in a roll film reading device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A roll film magazine frame for supporting a film spool which receives a roll film and for inserting through an insertion opening into a shaft of a micro roll film reading device, the roll film magazine frame comprising a polygonal body part having a plurality of sides and a plurality of corners each between two adjacent sides, said body part having a recess provided in one of said sides for introducing a film from a film coil into the reading device, an opening provided in another side for introducing a friction member of the reading device for contacting a roll film on the film spool, said sides of said body part including a further side which is accessible from outside when the magazine frame is inserted in the shaft, said further side being formed as a cover which is turnable outwardly away of a remaining portion of said body part so as to allow withdrawal of the film spool from said body part and insertion of another film spool into said body part.

2. A roll film magazine frame as defined in claim 1, wherein said body part is formed as a rectangular member having four such sides and four such corners.

3. A roll film magazine frame as defined in claim 1, wherein said cover extends over said further accessible side, one of said corners located at one end of said further accessible side, and an additional one of said sides after said one corner, said cover being turnably supported on the remaining portion of said body part in another corner located at the other end of said further accessible side.

4. A roll film magazine frame as defined in claim 3; and further comprising a flat spring provided between said cover and said remaining portion of said body part near said other corner and forming a turnable connection between said cover and said remaining portion of said body part and at the same time biasing said cover to a closed position in which it closes said further accessible side of said body part.

5. A roll film magazine frame as defined in claim 1; and further comprising a hinge pivotally connecting said cover with said remaining portion of said body part; and a flat spring located outside of said hinge and acting for pivoting said cover to an open position in which it is withdrawn from said further accessible side.

6. A roll film magazine frame as defined in claim 5, wherein said spring is fixedly connected with said cover and is displaceably clamped in said remaining portion of said body part.

7. A roll film magazine frame as defined in claim 1; and further comprising a releasable closure part provided between said cover and said remaining portion of said body part.

8. A roll film magazine frame as defined in claim 7, wherein said releasable locking part is formed as a synthetic plastic arresting member.

9. A roll film magazine frame particularly for insertion in the channel having a channel wall as defined in claim 1, wherein said cover is movable to a closed position in which it closes said further accessible side of said remaining portion of said body part, said cover being formed so that in said closed position it is held in form-locking manner by the wall of the channel.

10. A roll film magazine frame as defined in claim 1, wherein said body part has portions which are formed so that they partially surround the film spool when it is inserted in said body part, said portions each having one end, said body part further having an abutment plate which connects said portions of said body part at said one end and is formed for abutting of the film spool thereagainst.

11. A roll film magazine frame as defined in claim 10, wherein said portions of said body part and said abutment plate are formed of one-piece with one another.

12. A roll film magazine frame as defined in claim 10, wherein said abutment plate has a rectangular shape.

13. A roll film magazine frame as defined in claim 10, wherein said abutment plate has such a shape that together with said portions of said body part and with said cover it forms a rectangular contour.

* * * * *